(12) United States Patent
Suh et al.

(10) Patent No.: US 11,453,263 B2
(45) Date of Patent: Sep. 27, 2022

(54) COMPOSITE MATERIAL SPRING FOR SUSPENSION DEVICE OF VEHICLE, AND METHOD FOR CONTROLLING DRIVING OF VEHICLE USING THE SAME

(71) Applicants: Hyundai Motor Company, Seoul (KR); Kia Corporation, Seoul (KR)

(72) Inventors: Jingyo Suh, Anyang-si (KR); Ji Hoon Lee, Gangneung-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/371,686

(22) Filed: Jul. 9, 2021

(65) Prior Publication Data

US 2022/0176770 A1 Jun. 9, 2022

(30) Foreign Application Priority Data

Dec. 7, 2020 (KR) .................. 10-2020-0169510

(51) Int. Cl.
*B60G 17/04* (2006.01)
*B60G 17/015* (2006.01)
(Continued)

(52) U.S. Cl.
CPC ............. *B60G 17/04* (2013.01); *B60G 11/46* (2013.01); *B60G 17/0152* (2013.01); *B60G 17/0162* (2013.01); *B60G 2202/11* (2013.01); *B60G 2202/15* (2013.01); *B60G 2204/62* (2013.01); *B60G 2206/428* (2013.01); *B60G 2206/70* (2013.01); *B60G 2400/0512* (2013.01); *B60G 2400/106* (2013.01); *B60G 2400/41* (2013.01); *B60G 2400/821* (2013.01); *B60G 2500/20* (2013.01); *B60G 2600/182* (2013.01); *B60G 2800/014* (2013.01); *B60G 2800/162* (2013.01); *B60G 2800/24* (2013.01)

(58) Field of Classification Search
CPC .... B60G 17/04; B60G 11/46; B60G 17/0152; B60G 17/0162; B60G 2202/11; B60G 2202/15; B60G 2204/62; B60G 2206/428
See application file for complete search history.

(56) References Cited

U.S. PATENT DOCUMENTS 2,932,506 A * 4/1960 Mather ............... F16F 1/22
                                                    267/47
3,334,913 A * 8/1967 Margala ............. B60G 5/047
                                                    267/24
(Continued)

FOREIGN PATENT DOCUMENTS

DE          4337200 A1 * 5/1995  ............ F16F 9/532
DE     102009054458 A1 * 6/2011  ............ B32B 15/04
(Continued)

*Primary Examiner* — James A English
*Assistant Examiner* — Kurtis Nielson
(74) *Attorney, Agent, or Firm* — Slater Matsil, LLP (57) ABSTRACT

An embodiment composite material spring for a suspension device of a vehicle includes a leaf spring configured to be installed in a body of the vehicle and a wheel of the vehicle, a first fluid container installed at a left side of a center of the leaf spring and including a first magnetorheological fluid, and a second fluid container installed at a right side of the center of the leaf spring and including a second magnetorheological fluid.

19 Claims, 5 Drawing Sheets

(51) Int. Cl.
*B60G 11/46* (2006.01)
*B60G 17/016* (2006.01)

(56) References Cited

U.S. PATENT DOCUMENTS

| | | | | |
|---|---|---|---|---|
| 6,461,455 | B1 * | 10/2002 | Meatto | B60G 11/02 |
| | | | | 156/275.5 |
| 2003/0205860 | A1 * | 11/2003 | Carlstedt | F16F 13/00 |
| | | | | 267/217 |
| 2017/0051808 | A1 * | 2/2017 | Bogrash | F16F 1/22 |
| 2019/0100067 | A1 * | 4/2019 | Hintzen | B60G 17/08 |

FOREIGN PATENT DOCUMENTS

| | | | | | |
|---|---|---|---|---|---|
| DE | 102010043333 | A1 | * | 5/2012 | ............. F16F 13/30 |
| DE | 102010063504 | A1 | * | 6/2012 | ................ F16F 1/22 |
| JP | H04113044 | A | * | 4/1992 | |
| KR | 100706447 | B1 | * | 4/2007 | |
| KR | 20080102809 | A | * | 11/2008 | |
| KR | 102322264 | B1 | * | 11/2021 | |
| WO | WO-02074564 | A1 | * | 9/2002 | ............. B60G 11/24 |
| WO | WO-2022084535 | A1 | * | 4/2022 | |

\* cited by examiner

COMPOSITE MATERIAL SPRING FOR SUSPENSION DEVICE OF VEHICLE, AND METHOD FOR CONTROLLING DRIVING OF VEHICLE USING THE SAME

CROSS-REFERENCE TO RELATED APPLICATIONS

This application claims the benefit of Korean Patent Application No. 10-2020-0169510, filed on Dec. 7, 2020, which application is hereby incorporated herein by reference.

TECHNICAL FIELD

The present invention relates to a suspension device of a vehicle.

BACKGROUND

In general, a body of a vehicle is supported by a suspension device connected to a wheel. The suspension device absorbs various vibrations and impacts generated during vehicle driving to enhance a ride quality, and adjusts an overall balance of the vehicle body according to a road surface state. In addition, when the vehicle turns, the suspension device can secure stable controllability for a driver against a centrifugal force, and prevent a tilting phenomenon of the vehicle body caused by the centrifugal force.

In order to acquire the above effects, a leaf spring using a spring steel plate and a coil spring wound in a coil shape are generally applied to such a suspension device.

Among them, the leaf spring is primarily applied to the suspension device of a commercial vehicle. The leaf spring itself serves as a structure member as a part of the suspension device, and serves to prevent an external force from being directly transferred to a vehicle body frame and determine the ride quality by forming a reaction force to support a relative vertical motion generated in the vehicle body frame. Further, among the leaf springs applied to the suspension device for a vehicle, a leaf spring installed to connect left and right suspension devices in a transverse direction with respect to an anteroposterior direction of the vehicle body is referred to as a transverse leaf spring.

The above information disclosed in this Background section is only for enhancement of understanding of the background of the invention, and therefore it may contain information that does not form the prior art that is already known to a person of ordinary skill in the art.

SUMMARY

The present invention relates to a suspension device of a vehicle. Particular embodiments relate to a composite material spring for a suspension device of a vehicle, and a method for controlling driving of a vehicle using the same.

Embodiments of the present invention provide a composite material spring for a suspension device of a vehicle, and a method for controlling driving of a vehicle using the same, which can enhance a ride quality and driving stability of the vehicle.

An exemplary embodiment of the present invention provides a composite material spring for a suspension device of a vehicle, the composite material spring including a leaf spring installed in a body of a vehicle and a wheel of the vehicle, a first fluid container installed at a left side of the center of the leaf spring and including a first magnetorheological fluid, and a second fluid container installed at a right side of the center of the leaf spring and including a second magnetorheological fluid.

The first fluid container may include electromagnets that apply a magnetic field to the first magnetorheological fluid to adjust the stiffness of the composite material spring, and the second fluid container may include electromagnets that apply a magnetic field to the second magnetorheological fluid to adjust the stiffness of the composite material spring.

The first fluid container and the second fluid container may be installed in the leaf spring.

Another exemplary embodiment of the present invention provides a method for controlling driving of a vehicle using a composite material spring for a suspension device of a vehicle, the method including determining, by a controller, whether a longitudinal inclination angle of a vehicle according to a rear load of the vehicle is equal to or more than a reference inclination angle, and when the longitudinal inclination angle of the vehicle is equal to or more than the reference inclination angle, controlling, by the controller, the stiffness of a composite material spring installed in a rear wheel of the vehicle to be larger than the stiffness of a composite material spring installed in a front wheel of the vehicle, in which the composite material spring includes a leaf spring installed in a body of the vehicle and a wheel of the vehicle, a first fluid container installed at a left side of the center of the leaf spring and including a first magnetorheological fluid having stiffness adjusted according to the amount of output current of the controller, and a second fluid container installed at a right side of the center of the leaf spring and including a second magnetorheological fluid having stiffness adjusted according to the amount of output current of the controller.

The first fluid container may include first electromagnets that apply a magnetic field to the first magnetorheological fluid to adjust the stiffness of the magnetorheological fluid, and the second fluid container may include second electromagnets that apply a magnetic field to the second magnetorheological fluid to adjust the stiffness of the magnetorheological fluid.

The first fluid container and the second fluid container may be installed in the leaf spring.

The method for controlling driving of a vehicle using a composite material spring for a suspension device of a vehicle may further include determining, by the controller, whether a steering angle of a steering wheel of the vehicle is equal to or more than a reference steering angle and whether steering of the steering wheel of the vehicle is counterclockwise, and when the steering angle of the steering wheel of the vehicle is equal to or more than the reference steering angle and the steering of the steering wheel of the vehicle is counterclockwise, controlling, by the controller, the stiffness of a composite material spring installed in a right wheel of the vehicle to be larger than the stiffness of a composite material spring installed in a left wheel of the vehicle.

The method for controlling driving of a vehicle using a composite material spring for a suspension device of a vehicle may further include when the steering angle of the steering wheel of the vehicle is equal to or more than the reference steering angle and the steering of the steering wheel of the vehicle is clockwise, controlling, by the controller, the stiffness of the composite material spring installed in the left wheel of the vehicle to be larger than the stiffness of the composite material spring installed in the right wheel of the vehicle.

The method for controlling driving of a vehicle using a composite material spring for a suspension device of a vehicle may further include determining, by the controller, whether the steering angle of the steering wheel of the vehicle is equal to or more than a reference steering angle and whether a velocity of the vehicle is equal to or more than a reference velocity, and when the steering angle of the steering wheel of the vehicle is less than the reference steering angle and the velocity of the vehicle is equal to or more than the reference velocity, controlling, by the controller, the stiffness of the composite material springs including the composite material springs installed in the front wheel, the rear wheel, the left wheel, and the right wheel of the vehicle to be smaller than a reference value.

The method for controlling driving of a vehicle using a composite material spring for a suspension device of a vehicle may further include when the steering angle of the steering wheel of the vehicle is less than the reference steering angle and the velocity of the vehicle is less than the reference velocity, controlling, by the controller, the stiffness of the composite material springs, installed in the front wheel, the rear wheel, the left wheel, and the right wheel of the vehicle, with the reference value.

The method for controlling driving of a vehicle using a composite material spring for a suspension device of a vehicle may further include determining, by the controller, whether an acceleration velocity of the vehicle is equal to or more than a reference acceleration velocity and an acceleration of the vehicle is a forward-direction acceleration of the vehicle, and when the acceleration velocity of the vehicle is equal to or more than the reference acceleration velocity and the acceleration of the vehicle is the forward-direction acceleration of the vehicle, controlling, by the controller, the stiffness of the composite material spring installed in the rear wheel of the vehicle to be larger than a reference value.

The method for controlling driving of a vehicle using a composite material spring for a suspension device of a vehicle may further include when the acceleration velocity of the vehicle is less than the reference acceleration velocity, controlling, by the controller, the stiffness of the composite material springs including the composite material springs installed in the front wheel, the rear wheel, the left wheel, and the right wheel of the vehicle with the reference value.

The method for controlling driving of a vehicle using a composite material spring for a suspension device of a vehicle may further include when the acceleration velocity of the vehicle is equal to or more than the reference acceleration velocity and the acceleration of the vehicle is a backward-direction acceleration of the vehicle, controlling, by the controller, the stiffness of the composite material spring installed in the front wheel of the vehicle to be larger than the reference value.

The method for controlling driving of a vehicle using a composite material spring for a suspension device of a vehicle may further include determining, by the controller, whether there is a protrusion on a front road on which the vehicle is to travel, and after determining that there is the protrusion in the front road of the vehicle, controlling, by the controller, the stiffness of the composite material spring installed in the front wheel of the vehicle to be smaller than a reference value when the front wheel of the vehicle reaches the protrusion and then controlling, by the controller, the stiffness of the composite material spring installed in the rear wheel of the vehicle to be smaller than the reference value when the rear wheel of the vehicle reaches the protrusion.

The method for controlling driving of a vehicle using a composite material spring for a suspension device of a vehicle may further include when there is no protrusion on the front road of the vehicle, controlling, by the controller, the stiffness of the composite material springs including the composite material springs installed in the front wheel, the rear wheel, the left wheel, and the right wheel of the vehicle with the reference value.

According to the aforementioned exemplary embodiments of the present invention, a composite material spring for a suspension device of a vehicle, and a method for controlling driving of a vehicle using the same can enhance a ride quality and driving stability of the vehicle.

BRIEF DESCRIPTION OF THE DRAWINGS

A brief description of each drawing is provided in order to help more sufficient understanding of the drawings used in a detailed description of the present invention.

The following elements may be used in connection with the drawings to describe embodiments of the present invention.

10: Leaf spring
12: First fluid container
14: Second fluid container
200: Sensor
220: Controller
240: Composite material spring

DETAILED DESCRIPTION OF ILLUSTRATIVE EMBODIMENTS

In order to sufficiently appreciate embodiments of the present invention and objects achieved by carrying out embodiment of the present invention, reference should be made to the accompanying drawings illustrating the exemplary embodiments of the present invention and contents disclosed in the accompanying drawings.

Hereinafter, embodiments of the present invention will be described in detail by describing the exemplary embodiments of the present invention with reference to the accompanying drawings. In the following description of embodiments of the present invention, detailed explanations on related publicly-known configurations or functions are omitted when it is determined that the detailed explanations may obscure the subject matter of the present invention. Like reference numerals presented in each drawing may refer to like elements.

Terms used in the present specification are used only to describe specific exemplary embodiments, and are not intended to limit the present invention. A singular form may include a plural form unless otherwise clearly defined in the context. In the present specification, it should be understood that term "include" or "have" indicates the presence of a feature, a number, a step, an operation, a component, a part or the combination thereof described in the specification, but does not exclude the possibility of presence or addition of one or more other features, numbers, steps, operations, components, parts or combinations thereof, in advance.

Throughout the specification, when it is described that a part is "connected" with another part, it means that the part may be "directly connected" with the other part and the parts may be "electrically or mechanically connected" to each other with still another element interposed therebetween.

Unless otherwise defined, terms used herein and including technological or scientific terms have the same meanings as those generally understood by those with ordinary skill in the art (those skilled in the art). Terms which are defined in a generally used dictionary should be interpreted to have the same meaning as the meaning in the context of the related art, and are not interpreted as ideally or excessively formal meanings unless clearly defined in the present specification.

A leaf spring of a commercial vehicle serves to support a load of a vehicle and secure a ride quality of the vehicle. Since a composite material leaf spring formed by a single board used in a large truck and a transverse leaf spring applied to a medium-sized bus do not separately include a spring whose stiffness is adjusted, the composite material leaf spring of the single board and the transverse leaf spring may have a single stiffness and the stiffness thereof may not be adjusted. Accordingly, the composite material leaf spring of the single board and the transverse leaf spring may not enhance the ride quality of the vehicle. The composite material may be fiber reinforced plastic (FRP).

Figure 1:
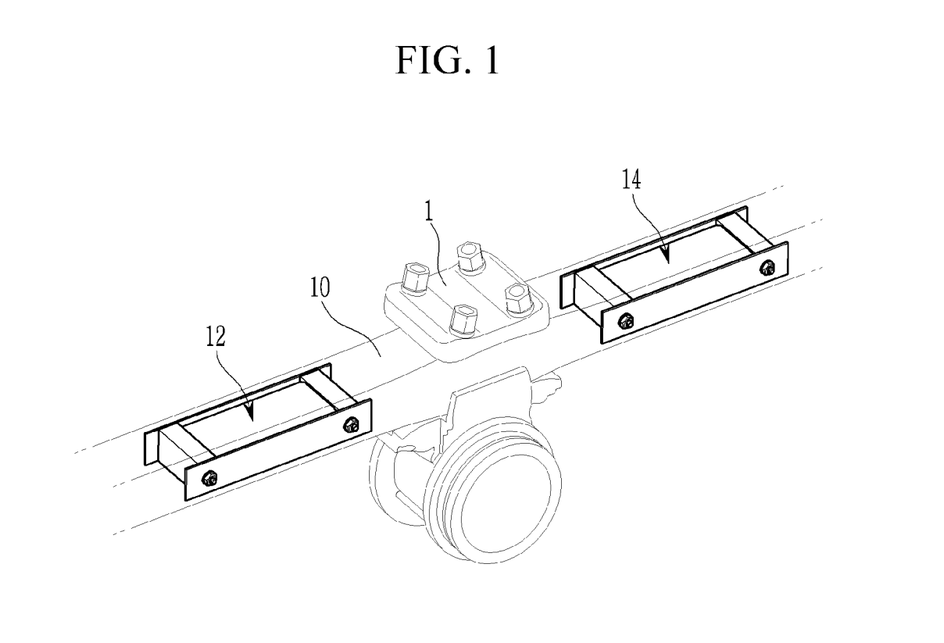
FIG. 1 is a diagram (perspective view) for describing a composite material spring for a suspension device of a vehicle according to an exemplary embodiment of the present invention.
Figure 2:
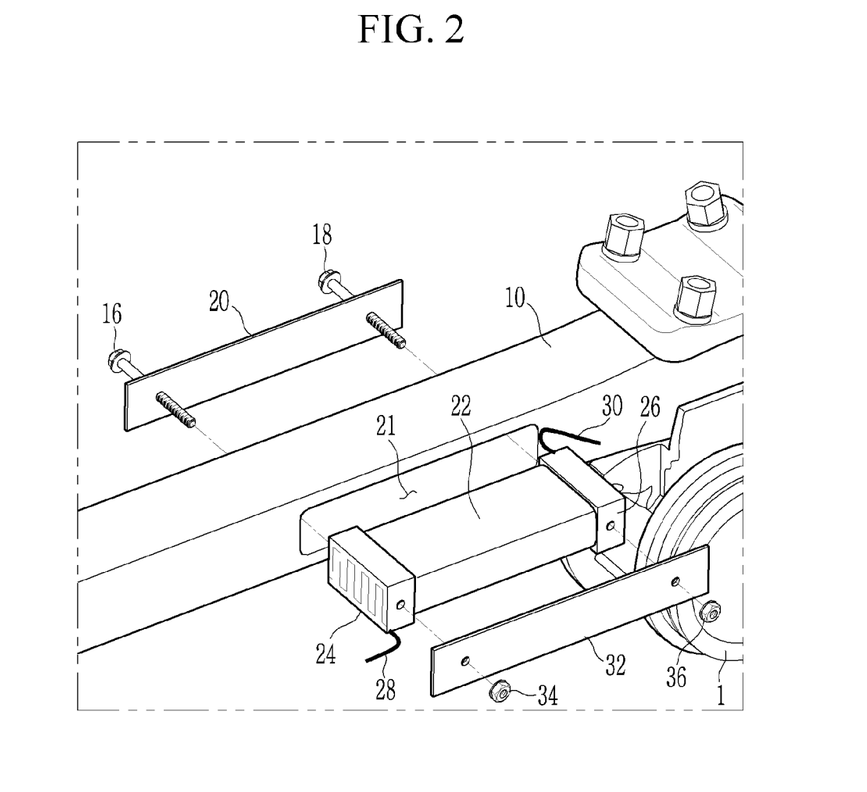
FIG. 2 is a diagram for describing a fluid container included in the composite material spring for a suspension device of a vehicle illustrated in FIG. 1.

FIG. 1 is a diagram (perspective view) for describing a composite material spring for a suspension device of a vehicle according to an exemplary embodiment of the present invention. FIG. 2 is a diagram for describing a fluid container (or fluid member) included in the composite material spring for a suspension device of a vehicle illustrated in FIG. 1.

Referring to FIGS. 1 and 2, the composite material spring for a suspension device of a vehicle may include a leaf spring 10 installed in a body of a vehicle (e.g., a commercial vehicle) and a wheel of the vehicle, a first fluid container 12 installed at a left side of the center of the leaf spring 10 and including a first magnetorheological fluid, and a second fluid container 14 installed at a right side of the center of the leaf spring 10 and including a second magnetorheological fluid. For example, the leaf spring 10 may be a transverse leaf spring.

The leaf spring 10 may be formed by a single board, and may be connected to the body of the vehicle through a connection member 1. For example, the leaf spring 10 may be made of a composite material such as fiber reinforced plastic (FRP).

The first fluid container 12 may include electromagnets 24 and 26 that adjust the stiffness of the composite material spring by applying a magnetic field to the first magnetorheological fluid, and a fluid bag 22 including the first magnetorheological fluid. The electromagnets 24 and 26 may be installed on both sides of the fluid bag 22, respectively. For example, a material of the fluid bag 22 may be rubber.

When the magnetic field is applied to the first magnetorheological fluid, a viscosity of the first magnetorheological fluid may be changed to adjust (or control) the stiffness of the first magnetorheological fluid. When the amount of current supplied to the electromagnets 24 and 26 through cables 28 and 30 increases, the viscosity of the first magnetorheological fluid increases, and as a result, the stiffness of the first magnetorheological fluid may increase.

The first fluid container 12 may be installed in a hole 21 formed in the leaf spring 10. For example, the first fluid container 12 may be installed in the hole 21 of the leaf spring 10 through bolts 16 and 18, side plates 20 and 32, and nuts 34 and 36. In another exemplary embodiment of the present invention, the first fluid container 12 may be installed on the surface of the leaf spring 10.

The components of the second fluid container 14 may be the same as those of the first fluid container 12.

Figure 3:
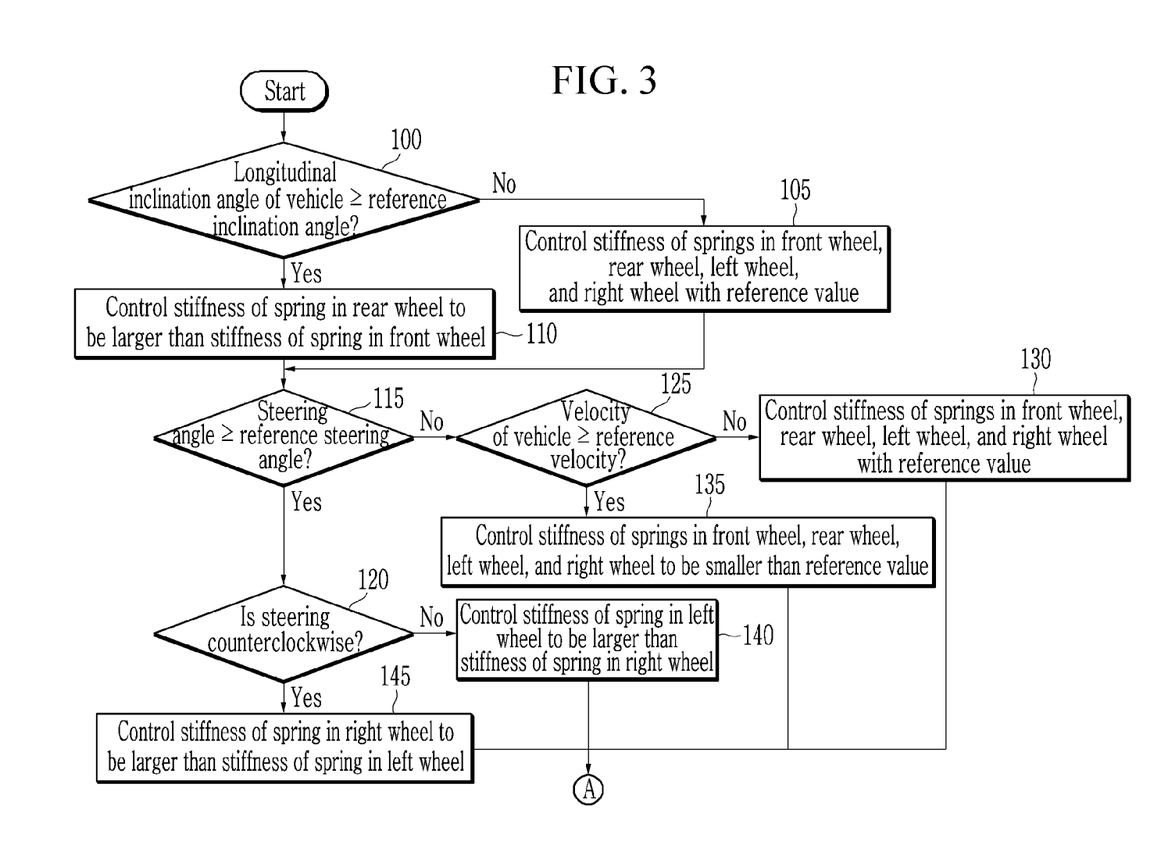
FIGS. 3 and 4 are flowcharts for describing a method for controlling driving of a vehicle using a composite material spring for a suspension device of a vehicle according to an exemplary embodiment of the present invention.
Figure 4:
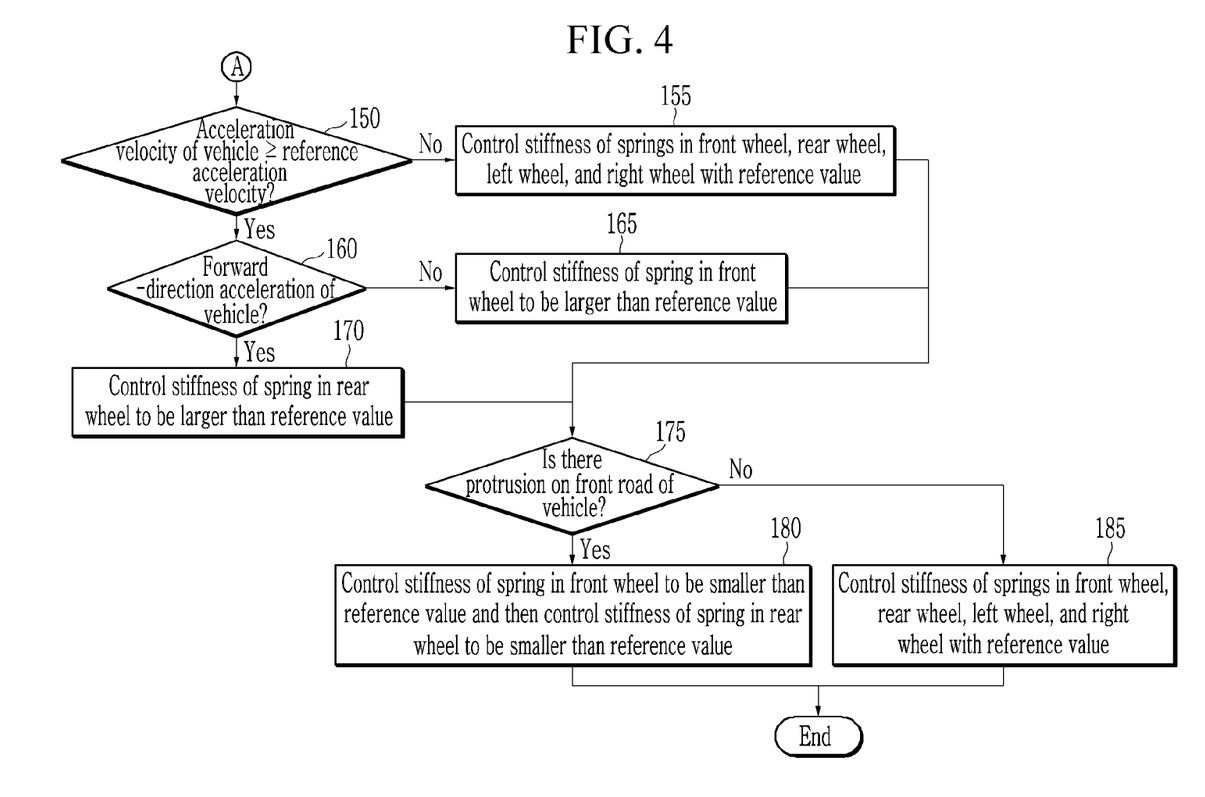
Figure 5:
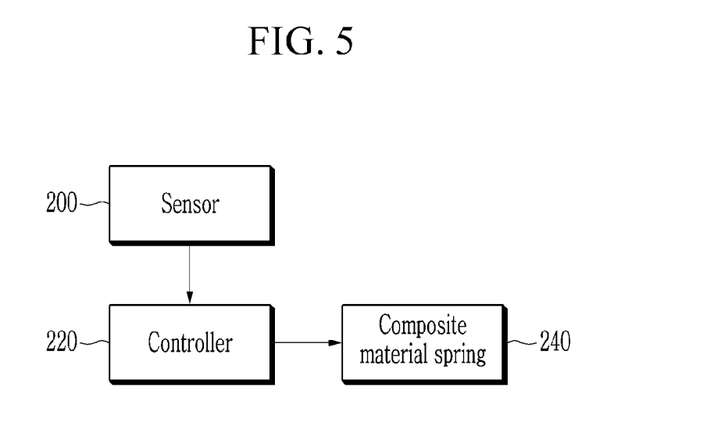
FIG. 5 is a block diagram for describing a driving control device of a vehicle to which the method for controlling driving of a vehicle illustrated in FIGS. 3 and 4 is applied.

FIGS. 3 and 4 are flowcharts for describing a method for controlling driving of a vehicle using a composite material spring for a suspension device of a vehicle according to an exemplary embodiment of the present invention. FIG. 5 is a block diagram for describing a driving control device of a vehicle to which the method for controlling driving of a vehicle illustrated in FIGS. 3 and 4 is applied.

Referring to FIGS. 1, 3, 4, and 5, in a determination step 100, a controller 220 may determine whether a longitudinal inclination angle of a vehicle according to a rear load (weight) of the vehicle is equal to or more than a reference inclination angle (e.g., 1 degree). The rear load of the vehicle may be generated by a person who rides in the vehicle or an article loaded on the vehicle. For example, the longitudinal inclination angle of the vehicle may be detected by a gyro sensor included in a sensor 200 and provided to the controller 220.

The controller 220 as an electronic control unit (ECU) may control all operations of the driving control device of the vehicle, which includes the sensor 200, the controller 220, and the composite material spring 240 illustrated in FIG. 1. The controller 220 may be, for example, one or more microprocessors which operate by a program (control logic) or hardware (e.g., a microcomputer) including the microprocessors, and the program may include a series of instructions for performing the method for controlling driving of a vehicle using a composite material spring for a suspension device of a vehicle according to an exemplary embodiment of the present invention. The instructions may be stored in a memory of the driving control device of a vehicle or the controller 220.

The method for controlling driving of a vehicle using a composite material spring for a suspension device of a vehicle, which is a process when the longitudinal inclination angle of the vehicle is equal to or more than the reference inclination angle, may proceed to step 110, and the method for controlling driving of a vehicle using a composite material spring for a suspension device of a vehicle, which is a process when the longitudinal inclination angle of the vehicle is less than the reference inclination angle, may proceed to step 105.

According to step 105, the controller 220 may control (or adjust) the stiffness of the composite material springs 240 installed in wheels (e.g., a front-left wheel, a rear-left wheel, a front-right wheel, and a rear-right wheel) of the vehicle with a reference value. The reference value may be determined by a test (or an experiment).

According to step 110, the controller 220 may control the stiffness of the composite material spring 240 installed in the rear wheel of the vehicle to be larger than the stiffness of the composite material spring 240 installed in the front wheel of the vehicle. Accordingly, ride quality and driving stability of the vehicle may be enhanced. For example, the stiffness of the composite material spring 240 installed in the rear wheel of the vehicle and the stiffness of the composite material spring 240 installed in the front wheel of the vehicle may be larger than the reference value. The stiffness of the composite material spring 240 installed in the front wheel of the vehicle may be the reference value and the stiffness of the composite material spring 240 installed in the rear wheel of the vehicle may be larger than the reference value.

According to step 115, after steps 105 and 110, the controller 220 may determine whether a steering angle of a steering wheel (or handle) of the vehicle is equal to or more than a reference steering angle (e.g., 5 degrees). For example, the steering angle may be detected by a steering angle sensor included in the sensor 200 and provided to the controller 220.

The method for controlling driving of a vehicle using a composite material spring for a suspension device of a vehicle, which is a process when the steering angle of the steering wheel of the vehicle is equal to or more than the reference steering angle, may proceed to step 120, and the method for controlling driving of a vehicle using a composite material spring for a suspension device of a vehicle, which is a process when the steering angle of the steering wheel of the vehicle is less than the reference steering angle, may proceed to step 125.

According to step 120, the controller 220 may determine whether steering of the steering wheel of the vehicle is counterclockwise.

The method for controlling driving of a vehicle using a composite material spring for a suspension device of a vehicle, which is a process when the steering of the steering wheel of the vehicle is counterclockwise (or when the vehicle turns left), may proceed to step 145, and the method for controlling driving of a vehicle using a composite material spring for a suspension device of a vehicle, which is a process when the steering of the steering wheel of the vehicle is clockwise (or when the vehicle turns right), may proceed to step 140.

According to step 140, the controller 220 may control the stiffness of the composite material spring 240 installed in the left wheel of the vehicle to be larger than the stiffness of the composite material spring 240 installed in the right wheel of the vehicle. Accordingly, the ride quality and driving stability of the vehicle may be enhanced. For example, the stiffness of the composite material spring 240 installed in the left wheel of the vehicle may be larger than the reference value, and the stiffness of the composite material spring 240 installed in the right wheel of the vehicle may be smaller than the reference value.

According to step 145, the controller 220 may control the stiffness of the composite material spring 240 installed in the right wheel of the vehicle to be larger than the stiffness of the composite material spring 240 installed in the left wheel of the vehicle. Accordingly, the ride quality and driving stability of the vehicle may be enhanced. For example, the stiffness of the composite material spring 240 installed in the right wheel of the vehicle may be larger than the reference value, and the stiffness of the composite material spring 240 installed in the left wheel of the vehicle may be smaller than the reference value.

According to step 125, the controller 220 may determine whether a velocity of the vehicle is equal to or more than a reference velocity (e.g., 30 (km/h)). For example, the velocity of the vehicle may be detected by a velocity sensor included in the sensor 200 and provided to the controller 220.

The method for controlling driving of a vehicle using a composite material spring for a suspension device of a vehicle, which is a process when the velocity of the vehicle is equal to or more than the reference velocity (or when the vehicle travels at a high velocity), may proceed to step 135, and the method for controlling driving of a vehicle using a composite material spring for a suspension device of a vehicle, which is a process when the velocity of the vehicle is less than the reference velocity (or when the vehicle travels at a low velocity), may proceed to step 130.

According to step 130, the controller 220 may control (or adjust) the stiffness of the composite material springs 240 installed in the front wheel, the rear wheel, the left wheel, and the right wheel of the vehicle with the reference value.

According to step 135, the controller 220 may control (or adjust) the stiffness of the composite material springs 240 installed in the front wheel, the rear wheel, the left wheel, and the right wheel of the vehicle to be smaller than the reference value. Accordingly, the ride quality and driving stability of the vehicle may be enhanced.

According to step 150, after steps 130, 135, 140, and 145, the controller 220 may determine whether an acceleration velocity (or an acceleration) of the vehicle is equal to or more than a reference acceleration velocity (e.g., 3.92 (m/s$^2$)). For example, the acceleration velocity of the vehicle may be detected by an acceleration sensor included in the sensor 200 and provided to the controller 220.

The method for controlling driving of a vehicle using a composite material spring for a suspension device of a vehicle, which is a process when the acceleration velocity of the vehicle is equal to or more than the reference acceleration velocity, may proceed to step 160, and the method for controlling driving of a vehicle using a composite material spring for a suspension device of a vehicle, which is a process when the acceleration velocity of the vehicle is less than the reference acceleration velocity, may proceed to step 155.

According to step 160, the controller 220 may determine whether an acceleration of the vehicle is a forward-direction acceleration of the vehicle.

The method for controlling driving of a vehicle using a composite material spring for a suspension device of a vehicle, which is a process when the acceleration of the vehicle is the forward-direction acceleration (or when the vehicle is suddenly accelerated), may proceed to step 170, and the method for controlling driving of a vehicle using a composite material spring for a suspension device of a vehicle, which is a process when the acceleration of the vehicle is a backward-direction acceleration of the vehicle (or the vehicle is suddenly braked), may proceed to step 165.

According to step 165, the controller 220 may control the stiffness of the composite material spring 240 installed in the front wheel of the vehicle to be larger than the reference value. Accordingly, the ride quality and driving stability of the vehicle may be enhanced.

According to step 170, the controller 220 may control the stiffness of the composite material spring 240 installed in the rear wheel of the vehicle to be larger than the reference value. Accordingly, the ride quality and driving stability of the vehicle may be enhanced.

According to step 155, the controller 220 may control (or adjust) the stiffness of the composite material springs 240 installed in the front wheel, the rear wheel, the left wheel, and the right wheel of the vehicle with the reference value.

According to another exemplary embodiment of the present invention, steps 150, 155, 160, 165, and 170 may be performed after steps 105 and 110.

According to step 175, after steps 155, 165, and 170, the controller 220 may determine whether there is a bump or protrusion (e.g., a speed bump) on a front road on which the vehicle is to travel. For example, the protrusion on the road may be detected by a camera included in the sensor 200 and provided to the controller 220.

The method for controlling driving of a vehicle using a composite material spring for a suspension device of a vehicle, which is a process when there is the protrusion on the front road of the vehicle, may proceed to step 180, and the method for controlling driving of a vehicle using a composite material spring for a suspension device of a vehicle, which is a process when there is no protrusion on the front road of the vehicle (or the front road of the vehicle is a flat road), may proceed to step 185.

According to step 180, when the front wheel of the vehicle reaches the protrusion, the controller 220 may control the stiffness of the composite material spring 240 installed in the front wheel of the vehicle to be smaller than the reference value, and then when the rear wheel of the vehicle reaches the protrusion, the controller 220 may control the stiffness of the composite material spring 240 installed in the rear wheel of the vehicle to be smaller than the reference value. Accordingly, the ride quality and driving stability of the vehicle may be enhanced.

The controller 220 may calculate a time that it takes for the front wheel of the vehicle to reach the protrusion, based on the velocity of the vehicle detected by the velocity sensor included in the sensor 200, a position of the protrusion detected by the camera included in the sensor 200, and a distance between the vehicle and the protrusion detected by light detection and ranging (LiDAR) included in the sensor 200. The controller 220 may calculate a time that it takes for the rear wheel of the vehicle to reach the protrusion, based on the velocity of the vehicle detected by the velocity sensor included in the sensor 200, the position of the protrusion detected by the camera included in the sensor 200, the distance between the vehicle and the protrusion detected by the light detection and ranging (LiDAR) included in the sensor 200, and a distance (wheelbase) between the front wheel and the rear wheel of the vehicle.

According to step 185, the controller 220 may control (or adjust) the stiffness of the composite material springs 240 installed in the front wheel, the rear wheel, the left wheel, and the right wheel of the vehicle with the reference value.

According to another exemplary embodiment of the present invention, steps 175, 180, and 185 may be performed after steps 105 and 110.

A component, "unit", or block or module used in the exemplary embodiments of the present invention may be implemented as software such as a task, a class, a sub routine, a process, an object, an execution thread, and a program performed in a predetermined area on the memory or hardware such as a field programmable gate array (FPGA) or application-specific integrated circuit (ASIC), and further, may be configured by a combination of the software and the hardware. The component or 'unit' may be included in a computer readable storage medium and some of the component or 'unit' may be dispersed and distributed in a plurality computers.

As described above, the embodiments are disclosed in the drawings and the specification. Although specific terms have been used herein, the terms are only used for the purpose of describing embodiments of the present invention and are not used to limit a meaning or limit the scope of the present invention defined in the claims. Therefore, those skilled in the art will appreciate that various modifications and equivalent embodiments can be made from the present invention. Accordingly, the true technical scope of the present invention should be defined by the technical spirit of the appended claims.

What is claimed is:

1. A composite material spring for a suspension device of a vehicle, the composite material spring comprising:
    a leaf spring configured to be installed at a body of the vehicle and a wheel of the vehicle;
    a first fluid container installed at a left side of a center of the leaf spring and including a first magnetorheological fluid; and
    a second fluid container installed at a right side of the center of the leaf spring and including a second magnetorheological fluid, wherein:
    the first fluid container includes first electromagnets configured to apply a first magnetic fluid to the first magnetorheological fluid to adjust a stiffness of the composite material spring; and
    the second fluid container includes second electromagnets configured to apply a second magnetic field to the second magnetorheological fluid to adjust the stiffness of the composite material spring.

2. The composite material spring of claim 1, wherein the first fluid container and the second fluid container are installed in respective holes in the leaf spring.

3. The composite material spring of claim 1, wherein the first fluid container and the second fluid container are installed on a respective surface of the leaf spring.

4. A method for controlling driving of a vehicle using a composite material spring for a suspension device of the vehicle, the method comprising:
    determining a longitudinal inclination angle of the vehicle according to a rear load of the vehicle as being greater than or equal to a reference inclination angle; and
    controlling a stiffness of the composite material spring installed at a rear wheel of the vehicle to be larger than a stiffness of a composite material spring installed at a front wheel of the vehicle,
    wherein the composite material spring comprises:
    a leaf spring installed at each of a body of the vehicle and wheels of the vehicle, including the front wheel and the rear wheel of the vehicle;
    a first fluid container installed at a left side of a center of the leaf spring and including a first magnetorheological fluid having a stiffness adjusted according to an amount of output current of a controller; and
    a second fluid container installed at a right side of the center of the leaf spring and including a second magnetorheological fluid having a stiffness adjusted according to the amount of output current of the controller.

5. The method of claim 4, wherein:
    the first fluid container includes first electromagnets that apply a first magnetic field to the first magnetorheological fluid to adjust the stiffness of the first magnetorheological fluid; and
    the second fluid container includes second electromagnets that apply a second magnetic field to the second magnetorheological fluid to adjust the stiffness of the second magnetorheological fluid.

6. The method of claim 4, wherein the first fluid container and the second fluid container are installed in respective holes in the leaf spring.

7. The method of claim 4, wherein the first fluid container and the second fluid container are installed on respective surfaces of the leaf spring.

8. The method of claim 4, further comprising:
    determining that a steering angle of a steering wheel of the vehicle is greater than or equal to a reference steering angle;

determining that steering of the steering wheel of the vehicle is counterclockwise; and controlling the stiffness of a composite material spring installed at a right wheel of the vehicle to be larger than the stiffness of a composite material spring installed at a left wheel of the vehicle.

9. The method of claim 4, further comprising:

determining that a steering angle of a steering wheel of the vehicle is greater than or equal to a reference steering angle;

determining that steering of the steering wheel of the vehicle is clockwise; and controlling the stiffness of a composite material spring installed at a left wheel of the vehicle to be larger than the stiffness of a composite material spring installed at a right wheel of the vehicle.

10. The method of claim 4, further comprising:

determining that a steering angle of a steering wheel of the vehicle is less than a reference steering angle;

determining that a velocity of the vehicle is greater than or equal to a reference velocity; and controlling the stiffness of the composite material springs installed at each of the wheels of the vehicle to be smaller than a reference value.

11. The method of claim 4, further comprising:

determining that a steering angle of a steering wheel of the vehicle is less than a reference steering angle;

determining that a velocity of the vehicle is less than a reference velocity; and controlling the stiffness of the composite material springs installed at each of the wheels of the vehicle with a reference value.

12. The method of claim 4, further comprising:

determining that an acceleration velocity of the vehicle is greater than or equal to a reference acceleration velocity;

determining that an acceleration of the vehicle is a forward-direction acceleration of the vehicle; and controlling the stiffness of the composite material spring installed at the rear wheel of the vehicle to be larger than a reference value.

13. The method of claim 4, further comprising:

determining that an acceleration velocity of the vehicle is less than a reference acceleration velocity; and controlling the stiffness of the composite material springs installed at each of the wheels of the vehicle with a reference value.

14. The method of claim 4, further comprising:

determining that an acceleration velocity of the vehicle is greater than or equal to a reference acceleration velocity;

determining that an acceleration of the vehicle is a backward-direction acceleration of the vehicle; and controlling the stiffness of the composite material spring installed at the front wheel of the vehicle to be larger than a reference value.

15. The method of claim 4, further comprising:

determining there is a protrusion on a front road on which the vehicle is to travel; and controlling, the stiffness of the composite material spring installed at the front wheel of the vehicle to be smaller than a reference value when the front wheel of the vehicle reaches the protrusion, and then controlling the stiffness of the composite material spring installed at the rear wheel of the vehicle to be smaller than the reference value when the rear wheel of the vehicle reaches the protrusion.

16. The method of claim 4, further comprising:

determining there is no protrusion on a front road on which the vehicle is to travel; and controlling the stiffness of the composite material springs installed at each of the wheels of the vehicle with a reference value.

17. A method for controlling driving of a vehicle using a composite material spring for a suspension device of the vehicle that includes a composite material spring at each of a body of the vehicle and wheels of the vehicle, wherein each of the composite material springs comprises a leaf spring, a first fluid container installed at a left side of the leaf spring and including a first magnetorheological fluid having a stiffness adjusted according to an amount of output current of a controller, and a second fluid container installed at a right side of the leaf spring and including a second magnetorheological fluid having a stiffness adjusted according to the amount of output current of the controller, the method comprising:

determining whether a longitudinal inclination angle of the vehicle according to a rear load of the vehicle is greater than, equal to, or less than a reference inclination angle; and controlling a stiffness of the composite material spring installed at one of the wheels of the vehicle based on whether the longitudinal inclination angle of the vehicle according to the rear load of the vehicle is greater than, equal to, or less than the reference inclination angle;

wherein controlling the stiffness of the composite material spring comprises controlling the stiffness of the composite material spring installed at the rear wheel of the vehicle to be larger than the stiffness of the composite material spring installed at the front wheel of the vehicle when the longitudinal inclination angle of the vehicle is greater than or equal to the reference inclination angle; and wherein controlling the stiffness of the composite material spring comprises controlling the stiffness of the composite material springs installed at each of the wheels of the vehicle with a first reference value when the longitudinal inclination angle of the vehicle is less than the reference inclination angle.

18. The method of claim 17, further comprising:

determining whether a steering angle of a steering wheel of the vehicle is greater than, equal to, or less than a reference steering angle;

wherein when it is determined the steering angle is greater than or equal to the reference steering angle, the method further comprises:

determining whether steering of the steering wheel of the vehicle is counterclockwise or clockwise;

controlling the stiffness of the composite material spring installed at a right wheel of the vehicle to be larger than the stiffness of the composite material spring installed at a left wheel of the vehicle when it is determined that the steering is counterclockwise; and controlling the stiffness of the composite material spring installed at the left wheel of the vehicle to be larger than the stiffness of the composite material spring installed at the right wheel of the vehicle when it is determined that the steering is clockwise; or wherein when it is determined that the steering angle is less than the reference steering angle, the method further comprises:

determining whether a velocity of the vehicle is greater than, equal to, or less than a reference velocity;

controlling the stiffness of the composite material springs installed at each of the wheels of the vehicle to be smaller than a second reference value when it is determined that the velocity of the vehicle is greater than or equal to the reference velocity; and controlling the stiffness of the composite material springs installed at each of the wheels of the vehicle with the second reference value when it is determined that the velocity of the vehicle is less than the reference velocity.

19. The method of claim 17, further comprising:

determining whether an acceleration velocity of the vehicle is greater than, equal to, or less than a reference acceleration velocity;

wherein when it is determined that the acceleration velocity of the vehicle is greater than or equal to the reference acceleration velocity, the method further comprises:

determining whether an acceleration of the vehicle is a forward-direction acceleration of the vehicle or a backward-direction acceleration of the vehicle;

controlling the stiffness of the composite material spring installed at the rear wheel of the vehicle to be larger than a second reference value when it is determined that the acceleration of the vehicle is the forward-direction acceleration of the vehicle; and controlling the stiffness of the composite material spring installed at the front wheel of the vehicle to be larger than the second reference value when it is determined that the acceleration of the vehicle is the backward-direction acceleration of the vehicle; or wherein when it is determined that the acceleration velocity of the vehicle is less than the reference acceleration velocity, the method further comprises:

controlling the stiffness of the composite material springs installed at each of the wheels of the vehicle with the second reference value.

* * * * *

UNITED STATES PATENT AND TRADEMARK OFFICE
CERTIFICATE OF CORRECTION

PATENT NO. : 11,453,263 B2
APPLICATION NO. : 17/371686
DATED : September 27, 2022
INVENTOR(S) : Jingyo Suh It is certified that error appears in the above-identified patent and that said Letters Patent is hereby corrected as shown below:

In the Claims

Claim 8, Column 11, Line 3; delete "a composite" and insert --the composite--.

Claim 8, Column 11, Line 5; delete "a composite" and insert --the composite--.

Claim 9, Column 11, Line 13; delete "a composite" and insert --the composite--.

Claim 9, Column 11, Line 15; delete "a composite" and insert --the composite--.

Claim 15, Column 11, Line 61; delete "at the" and insert --in the--.

Claim 17, Column 12, Line 32; delete "the rear" and insert --a rear--.

Claim 17, Column 12, Line 33; delete "the stiffness of the composite" and insert --a stiffness of a composite--.

Claim 17, Column 12, Line 34; delete "the front" and insert --a front--.

Signed and Sealed this
First Day of November, 2022

Katherine Kelly Vidal
*Director of the United States Patent and Trademark Office*